(12) United States Patent
Kageura

(10) Patent No.: US 9,972,842 B2
(45) Date of Patent: May 15, 2018

(54) SODIUM SECONDARY BATTERY ELECTRODE AND SODIUM SECONDARY BATTERY

(75) Inventor: Jun-ichi Kageura, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days. days.

(21) Appl. No.: 13/984,999

(22) PCT Filed: Feb. 8, 2012

(86) PCT No.: PCT/JP2012/053442
§ 371 (c)(1),
(2), (4) Date: Aug. 12, 2013

(87) PCT Pub. No.: WO2012/111681
PCT Pub. Date: Aug. 23, 2012

(65) Prior Publication Data
US 2013/0323590 A1    Dec. 5, 2013

(30) Foreign Application Priority Data

Feb. 15, 2011   (JP) ................................. 2011-029465

(51) Int. Cl.
| | | |
|---|---|---|
| H01M 4/485 | (2010.01) | |
| H01M 4/131 | (2010.01) | |
| H01M 4/62 | (2006.01) | |
| H01M 4/13 | (2010.01) | |
| H01M 4/505 | (2010.01) | |
| H01M 4/525 | (2010.01) | |
| H01M 4/58 | (2010.01) | |
| H01M 10/054 | (2010.01) | |
| H01M 4/02 | (2006.01) | |

(52) U.S. Cl.
CPC ............. *H01M 4/485* (2013.01); *H01M 4/13* (2013.01); *H01M 4/131* (2013.01); *H01M 4/623* (2013.01); *H01M 4/625* (2013.01); *H01M 4/505* (2013.01); *H01M 4/525* (2013.01); *H01M 4/5825* (2013.01); *H01M 10/054* (2013.01); *H01M 2004/021* (2013.01)

(58) Field of Classification Search
CPC ........ H01M 4/485; H01M 4/13; H01M 4/131; H01M 4/623; H01M 4/625; H01M 4/5825; H01M 4/525; H01M 4/505; H01M 2004/021; H01M 10/054
See application file for complete search history.

(56) References Cited

U.S. PATENT DOCUMENTS

| | | | | |
|---|---|---|---|---|
| 5,051,325 A | * | 9/1991 | Shishikura et al. .......... | 429/341 |
| 2009/0053613 A1 | | 2/2009 | Inoue et al. | |
| 2010/0028773 A1 | * | 2/2010 | Hirota et al. ................ | 429/203 |
| 2010/0248001 A1 | * | 9/2010 | Kuze et al. .................. | 429/144 |
| 2010/0266900 A1 | | 10/2010 | Makidera et al. | |
| 2011/0003191 A1 | | 1/2011 | Kuze et al. | |
| 2011/0159345 A1 | | 6/2011 | Makidera et al. | |
| 2011/0318638 A1 | * | 12/2011 | Koh et al. .................... | 429/217 |
| 2012/0021273 A1 | * | 1/2012 | Ohmori ............... | H01M 2/1686 |
| | | | | 429/144 |

FOREIGN PATENT DOCUMENTS

| | | | |
|---|---|---|---|
| CN | 1036105 A | | 10/1989 |
| CN | 101855173 A | | 10/2010 |
| CN | 101933181 A | | 12/2010 |
| JP | 02-030069 A | | 1/1990 |
| JP | 03-291864 A | | 12/1991 |
| JP | 11-040156 A | | 2/1999 |
| JP | 2006-216508 A1 | | 8/2006 |
| JP | 2009-129702 A | | 6/2009 |
| JP | 2009-135092 A | | 6/2009 |
| JP | 2009-224320 A | | 10/2009 |
| JP | 2009-252431 A | | 10/2009 |
| JP | 2010-80424 A | | 4/2010 |
| WO | WO2009060828 | * | 5/2009 |
| WO | WO2010092976 | * | 8/2010 |
| WO | 2010/110465 A1 | | 9/2010 |
| WO | WO2010110465 | * | 9/2010 |

OTHER PUBLICATIONS

International Search Report for PCT/JP2012/053442 dated Mar. 27, 2012.
First Office Action dated Feb. 12, 2015 in corresponding Chinese Patent Application No. 201280008320.0 with translation.
Communication dated Sep. 14, 2015 from the State Intellectual Property Office of the People's Republic of China in counterpart application No. 201280008320.0.
Communication dated Mar. 16, 2016, issued by the State Intellectual Property Office of the P.R.C. in corresponding Chinese Application No. 201280008320.0.
Communication dated Feb. 23, 2016 from the Japanese Patent Office in counterpart application No. 2012-026034.
Communication dated Oct. 25, 2016 from the Japanese Patent Office in counterpart Application No. 2012-026034.

* cited by examiner

*Primary Examiner* — Ula C Ruddock
*Assistant Examiner* — Matthew W Van Oudenaren
(74) *Attorney, Agent, or Firm* — Sughrue Mion, PLLC

(57) ABSTRACT

A sodium secondary battery electrode having an collector and an electrode mixture containing an electrode active material, a conductive material, and a binder, and wherein: the electrode active material has a sodium-containing transition metal compound, the conductivity of the electrode mixture is $5.0 \times 10^{-3}$ S/cm or more, and the density of the electrode mixture is 1.6 g/cm$^3$ or more.

6 Claims, No Drawings

SODIUM SECONDARY BATTERY ELECTRODE AND SODIUM SECONDARY BATTERY

CROSS REFERENCE TO RELATED APPLICATIONS

This application is a National Stage of International Application No. PCT/JP2012/053442 filed Feb. 8, 2012, claiming priority based on Japanese Patent Application No. 2011-029465, filed Feb. 15, 2011, the contents of all of which are incorporated herein by reference in their entirety.

TECHNICAL FIELD

The present invention relates to a sodium secondary battery electrode and a sodium secondary battery.

BACKGROUND ART

A sodium secondary battery is a nonaqueous electrolyte secondary battery. Since sodium constituting a sodium secondary battery is a material which is abundant in resource quantity and low in price, the mass supply of large-size power sources is expected by means of putting sodium secondary battery to practical use.

A sodium secondary battery usually includes an electrolyte and at least one pair of electrodes of a positive electrode including a positive electrode active material capable of doping and dedoping sodium ions, and a negative electrode including a negative electrode active material capable of doping and undoping sodium ions.

The electrode includes a current collector, and an electrode mixture formed on the said current collector. The electrode mixture includes an electrode active material such as a positive electrode active material or a negative electrode active material, a conductive material and a binder. The conductive material has a function of giving conductivity to the electrode mixture, and is necessary to bring out the performance of the electrode active material sufficiently. Examples of the conductive material include carbon materials such as acetylene black, and it has been known to use such a conductive material for a sodium secondary battery electrode (Patent Document 1).

PRIOR ART DOCUMENT

Patent Document

Patent Document 1: JP-A-2009-129702

DISCLOSURE OF INVENTION

However, even if the electrode includes, as an electrode active material, a sodium-containing transition metal compound capable of doping and dedoping sodium ions, and further includes a conductive material resulting in being improved in conductivity, a sodium secondary battery obtained therefrom may have a low charge-discharge efficiency or show a remarkable deterioration in charge-discharge cycle characteristic. The low charge-discharge efficiency may cause the drop of the amount of electricity which is taken from the battery, and the deterioration of the charge-discharge cycle characteristic may make the battery life shorter.

The present invention provides the followings.

<1> A sodium secondary battery electrode including a current collector and an electrode mixture containing an electrode active material, a conductive material and a binder, wherein the said electrode active material comprises a sodium-containing transition metal compound, the said electrode mixture has a conductivity of $5.0 \times 10^{-3}$ S/cm or more, and the said electrode mixture has a density of 1.6 g/cm$^3$ or more.

<2> The sodium secondary battery electrode according to <1>, wherein the conductive material contains a carbon material, and the said carbon material has a BET specific surface area of 10 m/g or more.

<3> The sodium secondary battery electrode according to <1> or <2> above, wherein the sodium-containing transition metal compound is a sodium-containing transition metal oxide represented by the following formula (A):

$$Na_xMO_2 \quad (A)$$

wherein M is at least one element selected from the group consisting of Fe, Ni, Cc, Mn, Cr, V, Ti, B, Al, Mg and Si, and x is more than 0 and not more than 1.2.

<4> The sodium secondary battery electrode according to any of <1> to <3>, wherein the binder comprises a copolymer having a structural unit derived from vinylidene halide.

<5> A sodium secondary battery including the electrode according to any of <1> to <4> as a positive electrode.

<6> The sodium secondary battery according to <5>, further including a separator.

MODE FOR CARRYING OUT THE INVENTION

<Sodium Secondary Battery Electrode>

The sodium secondary battery electrode includes a current collector and an electrode mixture containing an electrode active material, a conductive material and a binder, wherein the said electrode active material comprises a sodium-containing transition metal compound, the said electrode mixture has a conductivity of $5.0 \times 10^{-3}$ S/cm or more, and the said electrode mixture has a density of 1.6 g/cm$^3$ or more. The electrode mixture usually has been formed in a thin-layer on the current collector.

The conductivity of the electrode mixture is $5.0 \times 10^{-3}$ S/cm or more, preferably $1.0 \times 10^{-2}$ S/cm or more. The upper limit of the conductivity is usually 5.0 S/cm or less, preferably 2.0 S/cm or less.

The conductivity of the electrode mixture is determined by measuring the thin-layer electrode mixture which is held by an insulating film such as a PET film with the four-terminal method. For example, with regard to an electrode where the electrode mixture has been formed on the current collector, the thin-layer electrode mixture may be obtained by using an insulator such as an adhesive tape. Specifically, the electrode mixture in the electrode is transferred from the current collector to the insulator by sticking an adhesive tape on a surface of the electrode mixture in the electrode and then peeling the tape therefrom, and thus the thin-layer electrode mixture held by the insulating film is obtained. The conductivity of the resultant thin-layer electrode mixture held by the insulating film can be measured with the four-terminal method.

The density of the electrode mixture is 1.6 g/cm$^3$ or more, preferably 2.0 g/cm$^3$ or more. The upper limit of the density of the electrode mixture is typically 3.0 g/cm³ or less, preferably 2.85 g/cm³ or less.

The density of the electrode mixture represents the weight of the electrode mixture per unit volume of the electrode mixture, and is calculated by the following equation:

Electrode mixture density (g/cm³)=Electrode mixture weight (g)/Electrode mixture volume (cm³).

The weight of the electrode mixture in the electrode can be calculated by the following equation:

Electrode mixture weight (g)=Electrode weight (g)− Current collector weight (g).

The volume of the electrode mixture in the electrode can be calculated by the following equation by measuring a film thickness B of the electrode stamped out into a prescribed size (area A):

Electrode mixture volume (cm³)=$A$ (cm²)×($B$ (cm)− Current collector thickness (cm)).

<Electrode Active Material>

The electrode active material comprises a sodium-containing transition metal compound, and the sodium-containing transition metal compound is capable of doping and dedoping sodium ions.

Examples of the sodium-containing transition metal compound include the following compounds:

oxides represented by $NaM^1_{a1}O_2$ such as $NaFeO_2$, $NaMnO_2$, $NaNiO_2$ and $NaCoO_2$, oxides represented by $Na_{0.44}Mn_{1-a2}M^1_{a2}O_2$, and oxides represented by $Na_{0.7}Mn_{1-a2}M^1_{a2}O_{2.05}$ ($M^1$ is one or more transition metal element, $0<a1<1$, $0\le a2<1$);

oxides represented by $Na_bM^2_cSi_{12}O_{30}$ such as $Na_6Fe_2Si_{12}O_{30}$ and $Na_2Fe_5Si_{12}O_{30}$ ($M^2$ is one or more transition metal element, $2\le b\le 6$, $2\le c\le 5$);

oxides represented by $Na_dM^3_eSi_6O_{18}$ such as $Na_2Fe_2Si_6O_{18}$ and $Na_2MnFeSi_6O_{18}$ ($M^3$ is one or more transition metal element, $2\le d\le 6$, $1\le e\le 2$);

oxides represented by $Na_fM^4_gSi_2O_6$ such as $Na_2FeSiO_6$ ($M^4$ is at least one element selected from the group consisting of transition metal elements, Mg and Al, $1\le f\le 2$, $1\le g\le 2$);

phosphates such as $NaFePO_4$, $NaMnPO_4$, and $Na_3Fe_2(PO_4)_3$;

fluorophosphates such as $Na_2FePO_4F$, $Na_2VPO_4F$, $Na_2MnPO_4F$, $Na_2CoPO_4F$, and $Na_2NiPO_4F$;

fluorosulfates such as $NaFeSO_4F$, $NaMnSO_4F$, $NaCoSO_4F$, and $NaFeSO_4F$;

borates such as $NaFeBO_4$ and $Na_3Fe_2(BO_4)_3$; and fluorides represented by $Na_hM^5F_6$ such as $Na_3FeF_6$ and $Na_2MnF6$ ($M^5$ is at least one transition metal element, $2\le h\le 3$).

The sodium-containing transition metal compound is preferably a sodium-containing transition metal oxide, more preferably a sodium-containing transition metal oxide represented by the following formula (A):

$Na_xMO_2$     (A)

wherein M is one or more element selected from the group consisting of Fe, Ni, Co, Mn, Cr, V, Ti, B, Al, Mg, and Si, and x is more than 0 and not more than 1.2.

In the case of using an oxide represented by the formula (A) as an electrode active material, especially as a positive electrode active material, the charge-discharge capacity of a sodium secondary battery may be increased.

In the formula (A), x is preferably 0.8 or more and 1.1 or less. This range may be particularly preferably applicable in the case where the binder in the electrode comprises a copolymer having a structural unit derived from vinylidene halide.

<Conductive Material>

The conductive material preferably contains a carbon material, more preferably consists solely of a carbon material.

The carbon material preferably has a BET specific surface area of 10 m/g or more. The BET specific surface area can be determined by the nitrogen adsorption method, and measured by using a typical automatic specific surface area measuring device. The upper limit of the BET specific surface area of the carbon material is typically 1300 m²/g or less, preferably 900 m²/g or less.

Examples of the conductive material include carbon black (e.g. acetylene black, ketjen black, and furnace black), and fibrous carbon materials (e.g. carbon nanotube, carbon nanofiber, and vapor-grown carbon fiber). Since the above carbon material has a large surface area, by adding to the electrode mixture in a small amount, the conductivity of the inside of the obtained electrode may be increased and the charge-discharge efficiency and the large-current discharge property may be improved. The proportion of the conductive material in the electrode mixture is preferably 3 to 20 parts by weight, more preferably 4 to 15 parts by weight to 100 parts by weight of the electrode active material.

The electrode mixture may contain two or more conductive materials. The conductivity of the electrode mixture may be controlled by using two or more conductive materials.

The conductive material may further contain a carbon material having a BET specific surface area of 10 m²/g or less, which allows the control of the conductivity of the electrode mixture.

<Binder>

Examples of the binder include a polymer of a fluorine compound. Examples of the fluorine compound include:

fluorinated olefins such as perfluorohexylethylene, tetrafluoroethylene, trifluoroethylene, vinylidene fluoride, vinyl fluoride, chlorotrifluoroethylene, and hexafluoropropylene;

fluorinated alkyl-substituted olefins such as perfluorohexylethylene;

fluorinated alkyl-substituted (meth)acrylates such as trifluoroethyl (meth)acrylate, trifluoropropyl (meth)acrylate and pentafluoropropyl (meth)acrylate;

fluoroalkylene oxides such as hexafluoropropylene oxide;

fluoroalkyl vinyl ethers such as perfluoropropyl vinyl ether and perfluorohexyl vinyl ether; and fluoroketones such as pentafluoroethyl ketone and hexafluoroacetone.

Examples of the binder other than the polymer of a fluorine compound include an addition polymer of a monomer having an ethylenic double bond not including fluorine atom.

Examples of the monomer include:

olefins such as ethylene, propylene, 1-butene, isobutene, and 1-pentene;

conjugated dienes such as 1,2-propadiene, 1,3-butadiene, isoprene, and 1,3-pentadiene;

carboxylic acid vinyl esters such as vinyl acetate, vinyl propionate, and vinyl laurate;

vinylaryls such as styrene, 2-vinylnaphthalene, 9-vinyl anthracene, and vinyl tolyl;

unsaturated dicarboxylic acids such as maleic acid, fumaric acid, mesaconic acid, glutaconic acid, and crotonic acid;

unsaturated dicarboxylic acids such as maleic acid, fumaric acid, methaconic acid, glutaconic acid, methaconic acid, and crotonic acid;

vinyl ethers such as 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methyl propyl vinyl ether, 5-hydroxypentyl vinyl ether, 6-hydroxyhexyl vinyl ether, and diethylene glycol monovinyl ether;

vinyl inorganic acids such as vinylphosphoric acid and vinylsulfonic acid;

acrylates such as methyl acrylate, ethyl acrylate, propyl acrylate, isopropyl acrylate, butyl acrylate, isobutyl acrylate, tert-butyl acrylate, pentyl acrylate, methoxyethyl acrylate, ethoxyethyl acrylate, 2-ethylhexyl acrylate, 2-hydroxyethyl acrylate, 2-hydroxypropyl acrylate, dimethylaminoethyl acrylate, diethylaminoethyl acrylate, benzyl acrylate, phenylethyl acrylate, glycidyl acrylate, phosphoric acid acrylate, and sulfonic acid acrylate;

methacrylates such as methyl methacrylate, ethyl methacrylate, propyl methacrylate, isopropyl methacrylate, butyl methacrylate, isobutyl methacrylate, tert-butyl methacrylate, pentyl methacrylate, methoxyethyl methacrylate, ethoxyethyl methacrylate, pentyl methacrylate, 2-ethylhexyl methacrylate, 2-hydroxyethyl methacrylate, 2-hydroxypropyl methacrylate, dimethyl amino ethyl methacrylate, diethyl amino ethyl methacrylate, benzyl methacrylate, phenylethyl methacrylate, glycidyl methacrylate, phosphoric acid methacrylate, and sulfonic acid methacrylate;

crotonates such as methyl crotonate, ethyl crotonate, propyl crotonate, butyl crotonate, isobutyl crotonate, tert-butyl crotonate, pentyl crotonate, n-hexyl crotonate, 2-ethylhexyl crotonate, and hydroxypropyl crotonate;

unsaturated dicarboxylates such as dimethyl maleate, monooctyl maleate, monobutyl maleate and monooctyl itaconate;

inorganic acid esters such as methyl vinylphosphate, ethyl vinylphosphate, propyl vinylphosphate, methyl vinylsulfonate, ethyl vinylsulfonate, and propyl vinylsulfonate;

unsaturated alcohols such as vinyl alcohol and allyl alcohol;

unsaturated nitriles such as acrylonitrile and methacrylonitrile;

(meth)acrylamide-based monomers such as (meth)acrylamide, N-methylol (meth)acrylamide, and diacetone acrylamide;

halogen atom-containing monomers except fluorine such as chlorine, bromine or iodine atom-containing monomer, vinyl chloride and vinylidene chloride; and vinyl cyclic lactams such as N-vinylpyrrolidone and N-vinyl caprolactam.

The glass transition temperature of the binder is preferably −50 to 0° C. By making the glass transition temperature within the above-described range, the flexibility of the obtained electrode may be improved, and a sodium secondary battery which is practically usable even under a low-temperature environment can be obtained.

Preferred examples of the binder include fluorine resins such as polytetrafluoroethylene, polychlorotrifluoroethylene, tetrafluoroethylene-perfluoroalkylvinylether copolymer, ethylene-tetrafluoroethylene copolymer, ethylene-chlorotrifluoroethylene copolymer, and tetrafluoroethylene-hexafluoropropylene copolymer;

copolymers having a structural unit derived from vinylidene halide such as vinylidenefluoride-hexafluoropropylene copolymer, vinylidenefluoride-tetrafluoroethylene copolymer, vinylidenefluoride-hexafluoropropylene-tetrafluoroethylene copolymer, vinylidenefluoride-pentafluoropropylene copolymer, vinylidenefluoride-pentafluoropropylene-tetrafluoroethylene copolymer, vinylidenefluoride-perfluoromethyl vinyl ether-tetrafluoroethylene copolymer, and vinylidenefluoride-chlorotrifluoroethylene copolymer;

acrylic polymers such as polyacrylic acid, polyalkyl acrylate (wherein the number of carbon atoms in an alkyl moiety is 1 to 20), acrylic acid-alkyl acrylate (wherein the number of carbon atoms in an alkyl moiety is 1 to 20) copolymer, polyacrylonitrile, acrylic acid-alkyl acrylate-acrylonitrile copolymer, polyacrylamide, acrylonitrile-butadiene copolymer, and acrylonitrile-butadiene copolymer hydride;

methacrylic polymers such as polymethacrylic acid, poly (alkyl methacrylate) (wherein the number of carbon atoms in an alkyl moiety of an alkyl group is 1 to 20), and methacrylic acid-alkyl methacrylate copolymer;

olefin polymers such as polyvinyl alcohol (which is partially saponified or completely saponified), ethylene-vinyl alcohol copolymer, polyvinyl pyrrolidone, ethylene-vinyl acetate copolymer, ethylene-vinyl acetate-alkyl acrylate (the number of carbon atoms in an alkyl moiety of an alkyl group is 1 to 20) copolymer, ethylene-methacrylic acid copolymer, ethylene-acrylic acid copolymer, ethylene-alkyl methacrylate copolymer, ethylene-alkyl acrylate copolymer, and ethylene-acrylonitrile copolymer; and styrene-containing polymers such as acrylonitrile-styrene-butadiene copolymer, styrene-acrylonitrile copolymer, styrene-butadiene copolymer, and styrene-butadiene copolymer hydride.

Particularly preferred as the binder is a copolymer having a structural unit derived from vinylidene halide. In the case of using the said copolymer as the binder, an electrode having a high electrode mixture density may be easily obtained, and the volume energy density of a sodium secondary battery is increased.

The binder may be a copolymer of a fluorine compound and a monomer including an ethylenic double bond which includes no fluorine atom.

The polymer can be obtained by emulsion polymerization, suspension polymerization, and dispersion polymerization. The polymer can also be obtained by solution polymerization, radiation-induced polymerization, and plasma polymerization.

The emulsifier and dispersant used in emulsion polymerization, suspension polymerization, and dispersion polymerization may be those used in ordinary emulsion polymerization method, suspension polymerization method, and dispersion polymerization method. Examples thereof include protective colloids such as hydroxyethyl cellulose, methyl cellulose, and carboxymethyl cellulose; nonionic surfactants such as polyoxyethylene alkyl ether, polyoxyethylene alkylphenol ether, polyoxyethylene-polyoxypropylene block copolymer, polyoxyethylene fatty acid ester, and polyoxyethylene sorbitan fatty acid ester; and anionic surfactants such as alkyl sulfate, alkylbenzene sulfonate, alkyl sulfosuccinate, alkyldiphenyl ether disulfonate, polyoxyethylene alkylsulfate, and polyoxyethylene alkyl phosphate. The emulsifier and dispersant may be used independently or in combination of two or more kinds. The addition amounts of the emulsifier and dispersant may be set adequately and these are usually about 0.01 to 10 parts by weight to the total monomer amount of 100 parts by weight;

however, depending on the condition of polymerization, it is not necessarily required to use the emulsifier and dispersant.

As the binder, a commercially available binder can be used.

<Method for Producing Electrode Active Material>

A known sodium-containing transition metal compound may be used. A sodium-containing transition metal oxide can be produced by calcining a mixture of metal-containing compounds having such composition that produce the said sodium-containing transition metal oxide by calcining. In particular, the compound can be produced by calcining the mixture which is obtained through weighing and mixing metal-containing compounds containing corresponding metal elements so as to be a predetermined composition. For instance, a sodium-containing transition metal oxide having a metal element ratio represented by Na:Mn:Fe:Ni=1:0.3:0.4:0.3, which is a preferred metal element ratio, can be produced by calcining and mixing the mixture which is obtained through weighing and mixing raw materials of $Na_2CO_3$, $MnO_2$, $Fe_3O_4$ and $Ni_2O_3$ in such a way that the molar ratio of Na:Mn:Fe:Ni is 1:0.3:0.4:0.3.

As the metal-containing compound which may be used to produce the sodium-containing transition metal oxide, an oxide or a compound which forms into an oxide when decomposed and/or oxidized at a high temperature, such as hydroxides, carbonates, nitrates, halides and oxalates, may be used. Examples of the sodium compound include one or more compounds selected from the group consisting of sodium hydroxide, sodium chloride, sodium nitrate, sodium peroxide, sodium sulfate, sodium hydrogen carbonate, sodium oxalate and sodium carbonate, and hydrates thereof. Sodium carbonate is more preferable in terms of handling. Preferable example of manganese compound is $MnO_2$, preferable example of iron compound is $Fe_3O_4$, and preferable example of nickel compound is $Ni_2O_3$. These metal-containing compounds may be hydrates.

The metal-containing compound mixture can also be obtained by producing a precursor by, for example, the coprecipitation method as described below and mixing the resultant precursor with the sodium compound.

For example, using a compound such as a chloride, a nitrate, an acetate, a formate or an oxalate for the raw material of M (here, M means the same as before), a precipitate containing the precursor can be obtained through dissolving these compounds in water, and bring them into contact with a precipitating agent. Among the raw materials, a chloride is preferable. In the case of using a raw material which is hardly soluble in water, i.e. in the case of using as the raw material, for example, an oxide, a hydroxide or a metal material, an aqueous solution containing M can be obtained by dissolving the raw materials in an acid such as hydrochloric acid, sulfuric acid, or nitric acid, or an aqueous solution of these acids.

One or more compounds selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate), $(NH_4)_2CO_3$ (ammonium carbonate) and $(NH_2)_2CO$ (urea) may be used as the precipitating agent, or hydrates of the compounds may also be used, or the compound and the hydrate may be used in combination. It is preferred to use the precipitating agent in the form of an aqueous solution by dissolving the precipitating agent in water. The concentration of the compound in an aqueous solution of the precipitating agent is about from 0.5 to 10 mol/L, preferably about from 1 to 8 mol/L. As the precipitating agent, KOH is preferred, and an aqueous KOH solution with KOH dissolved in water is more preferred. As the precipitating agent in the form of an aqueous solution, ammonia water may be cited, and this may be used in combination with an aqueous solution of the compound.

Examples of the method of bringing the aqueous solution containing M into contact with the precipitating agent include a method of adding the precipitating agent (including a precipitating agent in the form of an aqueous solution) to the aqueous solution containing M, a method of adding the aqueous solution containing M to the precipitating agent in the form of an aqueous solution, and a method of adding, to water, the aqueous solution containing M and the precipitating agent (including a precipitating agent in the form of an aqueous solution). It is preferred that the addition may be accompanied by stirring. Among the methods of contact as described above, a method of adding the aqueous solution containing M to the precipitating agent in the form of an aqueous solution is preferred in terms of the ease of keeping the pH, and the ease of controlling the particle diameter of the complex precursor. In this case, the pH tends to decrease with the addition of the aqueous solution containing M to the precipitating agent in the form of an aqueous solution. It is preferred to add the aqueous solution containing M while controlling the pH to be 9 or more, preferably 10 or more. This control can also be performed by adding the precipitating agent in the form of an aqueous solution.

As a result of the contact as described above, the precipitate can be obtained. The precipitate contains the precursor.

Further, after the contact of the aqueous solution containing M with the precipitating agent, a slurry is usually obtained, and solid-liquid separation of the slurry may be performed to recover the precipitate. The solid-liquid separation may be performed by any method, and from the viewpoint of operability, a method by the solid-liquid separation such as filtration is preferably used, and a method in which a liquid component is evaporated by heating such as a spray-drying method or the like may be used. The recovered precipitate may be subjected to washing, drying, and the like. An adhesion of excess precipitating agent component to the precipitate obtained after the solid-liquid separation may occur, and the excess component can be reduced by washing. As a washing liquid used in the washing, it is preferred to use water. Further, a water-soluble organic solvent such as alcohol or acetone may be used. The drying may be performed by heat-drying, or may be performed by air-blow drying, vacuum drying or the like. In the case of performing the drying by heat-drying, the heating temperature is typically from 50 to 300° C., preferably about from 100 to 200° C. The washing and drying may be performed twice or more.

While the mixing method may be either of dry mixing and wet mixing, dry mixing is preferred from the viewpoint of convenience. Examples of the mixing device include a stirring type mixing device, a V-type mixer, a W-type mixer, a ribbon mixer, a drum mixer and a ball mill. While depending on the kind of a sodium compound to be used, the calcining may be performed by keeping usually the mixture at a calcining temperature of about from 400 to 1200° C., and calcining temperature is preferably about from 500 to 1000° C. The time for keeping the calcining temperature is usually from 0.1 to 20 hours, preferably from 0.5 to 10 hours. The heating rate to the calcining temperature is usually from 50 to 400° C./hour, and the cooling rate from the calcining temperature to room temperature is usually from 10 to 400° C./hour. The air, oxygen, nitrogen, argon or a mixture gas thereof may be used for an atmosphere of the calcining, and the air is preferred.

The crystallinity of a sodium-containing transition metal oxide to be produced, and the average particle diameter of particles constituting the sodium-containing transition metal oxide may be controlled by using, as the metal-containing compound, a adequate amount of a halide such as a fluoride or a chloride. In this case, the halide may serve as a reaction accelerator (flux). Examples of the flux include NaF, $MnF_3$, $FeF_2$, $NiF_2$, $CoF_2$, NaCl, $MnCl_2$, $FeCl_2$, $FeCl_3$, $NiCl_2$, $CoCl_2$, $NH_4Cl$ and $NH_4I$, and these can be used as raw materials (the metal-containing compounds) for the mixture, or added in a adequate amount to the mixture. In addition, the flux may be a hydrate.

Other examples of the flux may include $Na_2CO_3$, $NaHCO_3B_2O_3$ and $H_3BO_3$.

The sodium-containing transition metal oxide may be pulverized by optionally using a conventional device used in industry such as a ball mill, a jet mill or a vibration mill, and washed or classified. Also, the particle size of the oxide can be controlled by such operation. The calcining may be performed twice or more. A surface treatment such as coating the surface of the particle of the sodium-containing transition metal oxide with an inorganic substance containing Si, Al, Ti, Y, etc. may be performed.

In the case of performing a thermal treatment following the surface treatment, depending on the temperature of the thermal treatment, the BET specific surface area of the powder after the thermal treatment may become smaller than the range of the BET specific surface area before the surface treatment.

<Electrode Mixture Paste>

Electrode mixture paste is used for forming the electrode mixture on a current collector. The electrode mixture paste can be produced by kneading the electrode active material as described above, the conductive material as described above, the binder as described above and an organic solvent. Preferred as the mixer used for the kneading is a device capable of applying a high shearing force to a kneaded mixture. In particular, a planetary mixer, a kneader, an extrusion-type kneading machine, thin-film spin system high-speed mixer or the like can be mentioned. The electrode mixture may contain two or more binders, whereby the fluidity of the electrode mixture paste, the binding ability between the electrode mixture and the current collector in the resultant electrode, and the flexibility thereof may be controlled.

Examples of the organic solvent as described above include polar solvents including amides such as N-methyl-2-pyrrolidone, N,N-dimethylacetamide, and dimethylformamide; alcohols such as isopropyl alcohol, ethyl alcohol, and methyl alcohol; ethers such as propylene glycol dimethyl ether and tetrahydrofuran; and ketones such as acetone, methyl ethyl ketone, and methyl isobutyl ketone, and nonpolar solvents such as hexane and toluene.

In regard to the order of mixing, the electrode active material powder, the conductive material, the binder and the organic solvent may be mixed collectively, or the binder, the electrode active material powder, and the conductive material may be mixed with the organic solvent separately. The binder may be dissolved in the organic solvent in advance. A mixture of the electrode active material powder and the conductive material may be gradually added to a mixed solution of the organic solvent and the binder.

The percentage of the amount of the electrode mixture (the total amount of the electrode active material, the conductive material and the binder) in the electrode mixture paste is, from the viewpoint of the thickness of the resultant electrode and the coating property thereof, usually from 30 to 90% by weight, preferably from 30 to 80% by weight, more preferably from 30 to 70% by weight.

<Method for Producing Sodium Secondary Battery Electrode>

The sodium secondary battery electrode is obtained by coating a current collector with the electrode mixture paste, and drying the resultant coated current collector. The organic solvent in the electrode mixture paste is removed by drying, and an electrode mixture is formed on the current collector, and then the electrode can be obtained.

Examples of the current collector include conductors such as Al, Ni, and stainless steel, and Al is preferred in terms of being easy to shape into a thin film and inexpensive. Examples of the shape of the current collector include a shape of foil, flat plate, mesh, net, lath, punching metal and embossed one, and combinations thereof (e.g. meshed flat plate). Irregularities may be formed on the surface of the current collector by etching.

Examples of the coating method include a doctor blade method, a slit-die coating method, a screen coating method, a curtain coating method, a knife coating method, a gravure coating method, and an electrostatic spray method. Examples of the method of drying after the coating include heat-drying, air-blow drying, and vacuum drying. The temperature of the heat-drying is usually about from 50 to 150° C.

The electrode may be rolled after drying. Examples of the rolling method include the mold press and the roll press. The rolling force, here, is usually from 50 to 2000 kN/m, preferably from 100 to 1000 kN/m. The thickness of the electrode is usually about from 5 to 500 μm. Thus, the sodium secondary battery electrode can be manufactured. The sodium secondary battery electrode is preferably used as a positive electrode of a sodium secondary battery.

<Sodium Secondary Battery>

The sodium secondary battery of the present invention preferably has the sodium secondary battery electrode of the present invention as a positive electrode. The sodium secondary battery can be manufactured by, for example, obtaining an electrode group by means of laminating, or laminating and winding, a positive electrode, a separator and a negative electrode, storing the electrode group in a battery can, and pouring an electrolytic solution in the battery can.

Examples of the shape of the electrode group include such a shape that the cross section taken in a direction perpendicular to the winding axis of the electrode group or in parallel with the laminating direction is circular, oval, rectangular, or round-cornered rectangular. Examples of the shape of the battery include paper, coin, cylindrical, and prismatic shapes.

<Negative Electrode of Sodium Secondary Battery>

Examples of the negative electrode of the sodium secondary battery include a sodium metal electrode, a sodium alloy electrode, and an electrode in which a negative electrode mixture containing a negative electrode active material is formed on a negative electrode current collector. The negative electrode of the sodium secondary battery is capable of doping and dedoping sodium ions at a potential lower than that of the positive electrode. In addition to sodium metal and a sodium alloy, examples of the negative electrode active material include carbon materials capable of doping and dedoping sodium ions, such as natural graphite, artificial graphite, coke, carbon black, pyrolytic carbon, carbon fiber, and a baked organic polymer compound. The shape of the carbon material is, for example, flaky like natural graphite, spherical like a mesocarbon microbead, fibrous like a graphitized carbon fiber, or an agglomerate of a fine powder. The carbon material may serve as a conductive material in some cases.

Also, a chalcogen compound, such as an oxide or a sulfide, which is capable of doping and dedoping with sodium ions at a potential lower than that of the positive electrode can be used as the negative electrode active material. Examples of the oxide include $Li_4Ti_5O_{12}$.

The negative electrode mixture may contain a binder and a conductive material, if necessary. Therefore, the negative electrode may contain a mixture of the negative electrode active material and the binder. As the binder, thermoplastic resins may be cited. Examples of the thermoplastic resins include PVdF, thermoplastic polyimide, carboxymethyl cellulose, polyethylene and polypropylene.

As the negative electrode current collector, Cu, Ni, stainless steel, and Al may be cited; Cu or Al is preferred in terms of hardly forming an alloy with sodium, and the ease of processing into a thin film. The method of supporting the negative electrode mixture on the negative electrode current collector is similar to the method of producing a sodium secondary battery electrode as described above, and the examples include a pressure molding method and a method in which the negative electrode mixture is formed into a paste with using a solvent or the like, the negative electrode current collector is coated with the paste, followed by drying and fixing firmly the negative electrode mixture to the negative electrode current collector by means of pressing or the like.

<Separator for Sodium Secondary Battery>

The separator is disposed between the positive electrode and the negative electrode in the secondary battery. Examples of the shape of the separator include a porous film, a nonwoven fabric, and a woven fabric. Examples of the material of the separator include polyolefin resins such as polyethylene and polypropylene, fluorine resins, and nitrogen-containing aromatic polymers. The separator may be a single-layer or multilayer separator with two or more kinds of these materials. Examples of the separator include the separators described in, for example, JP-A-2000-30686 and JP-A-10-324758. As long as the mechanical strength is maintained, the thickness of the separator is preferably as small as possible from the viewpoint that the volume energy density of the battery will increase and the internal resistance will decrease. The thickness of the separator is preferably about 5 to 200 μm, more preferably about 5 to 40 μm.

Preferably, the separator has a porous film containing a thermoplastic resin. In regard to a secondary battery, it is usually important to prevent flow of electric current in excess by blocking the current (to shutdown) when an abnormal electrical current flows in the battery due to a short circuit or the like between the positive electrode and the negative electrode. Therefore, it is required that the separator cause shutdown at a temperature as low as possible when it exceeds a normal operating temperature (if the separator has a porous film containing a thermoplastic resin, micropores of the porous film are closed), and that, even if the temperature inside the battery rises to a certain high level temperature after the shutdown, the separator film is not broken at the high level temperature to keep the shutdown. In other words, the separator is required to be a heat resistance higher. By using, as the separator, a separator composed of a laminated porous film in which a heat-resistant porous layer and a thermoplastic resin-containing porous film are laminated with each other, it becomes possible to further prevent the film from being broken by heat in a secondary battery. It is to be noted that the heat-resistant porous layer may be laminated on both sides of the porous film.

<Laminated Porous Film Separator>

The separator composed of a laminated porous film in which a heat-resistant porous layer and a thermoplastic resin-containing porous film are laminated with each other will be described below. Here, the thickness of the separator is usually 40 μm or less, preferably 20 μm or less. When the thickness of the heat-resistant porous layer is represented by A (μm) and the thickness of the porous film is represented by B (μm), the value of A/B is preferably 0.1 to 1. In view of ion permeability, the separator preferably has an air permeability of 50 to 300 sec/100 cc, more preferably 50 to 200 sec/100 cc, according to the Gurley method. The porosity of the separator is usually 30 to 80% by volume, preferably 40 to 70% by volume.

(Heat-Resistant Porous Layer)

In the laminated porous film, the heat-resistant porous layer may contain a heat-resistant resin. To further increase the ion permeability, it is preferred that the heat-resistant porous layer is a thin heat-resistant porous layer such as a layer having a thickness of 1 to 10 μm, more preferably 1 to 5 μm, particularly preferably 1 to 4 μm. And the heat-resistant porous layer has micropores of which the size (diameter) is usually 3 μm or less, preferably 1 μm or less. The heat-resistant porous layer may contain filler described later.

Examples of the heat-resistant resin which may be contained in the heat-resistant porous layer include polyamide, polyimide, polyamide-imide, polycarbonate, polyacetal, polysulfone, polyphenylene sulfide, polyether ether ketone, aromatic polyester, polyether sulfone and polyetherimide. To further enhance the heat resistance, polyamide, polyimide, polyamide-imide, polyether sulfone and polyetherimide are preferable, and polyamide, polyimide and polyamide-imide are more preferable, and nitrogen-containing aromatic polymers such as aromatic polyamides (para-oriented aromatic polyamides and meta-oriented aromatic polyamides), aromatic polyimides, and aromatic polyamide-imides are further more preferable, and aromatic polyamides are especially preferable, and para-oriented aromatic polyamides (hereinafter sometimes referred to as para-aramids) are particularly preferable. Other examples of the heat-resistant resin include poly-4-methyl pentene-1 and a cyclic olefin polymer. By Using these heat-resistant resins, the heat resistance may be enhanced, namely the temperature of the thermal film breakage may become higher.

While the temperature of thermal film breakage depends on the kind of the heat resistant resin, the temperature of thermal film breakage is usually 160° C. or higher. By using, as a heat resistant resin, the above-described nitrogen-containing aromatic polymer, the temperature of thermal film breakage may be raised up to about 400° C. The temperature of thermal film breakage may be raised up to about 250° C. by using poly-4-methyl pentene-1, and up to about 300° C. by using a cyclic olefin polymer, respectively.

The para-aramid is obtained by the condensation polymerization of para-oriented aromatic diamines with para-oriented aromatic dicarboxylic acid halides, and substantially have the repeating units which are bonded to each other through an amide bond at para position of the aromatic ring or orientation positions equivalent thereto (e.g. the 4,4' position in 4,4'-biphenylene, the 1,5 position in 1,5-naphthalene, and the 2,6 position in 2,6-naphthalene). Examples of the para-aramid include a para-aramid having a para-oriented structure or a structure equivalent to the para-oriented structure, specifically, poly(p-phenylene terephthalamide), poly(p-benzamide), poly(4,4'-benzanilide terephthalamide), poly(p-phenylene-4,4'-biphenylenedicarboxamide), poly(p-phenylene-2,6-naphthalenedicarboxamide), poly(2-chloro-p-phenylene terephthalamide), and p-phenylene terephthalamide/2,6-dichloro-p-phenylene terephthalamide copolymer.

As the aromatic polyimide described above, preferable is wholly aromatic polyimides produced by the condensation polymerization of aromatic dianhydrides and aromatic diamines. Specific examples of the dianhydride include pyromellitic dianhydride, 3,3',4,4'-diphenylsulfone tetracarboxylic dianhydride, 3,3',4,4'-benzophenone tetracarboxylic dianhydride, 2,2'-bis(3,4-dicarboxyphenyl)hexafluoropropane, and 3,3',4,4'-biphenyltetracarboxylic dianhydride. Examples of the diamine include oxydianiline, p-phenylenediamine, benzophenonediamine, 3,3'-methylenedianiline, 3,3'-diaminobenzophenone, 3,3'-diaminodiphenylsulfone, and 1,5-naphthalenediamine. Polyimides soluble in a solvent may be preferably used. Examples of such polyimide include the polyimide which is a polycondensate of 3,3',4,4'-diphenylsulfone tetracarboxylic dianhydride and aromatic diamines.

Examples of the aromatic polyamide-imide include those which are obtained by the condensation polymerization of aromatic dicarboxylic acids with aromatic diisocyanates, and those which are obtained by the condensation polymerization of aromatic dianhydrides with aromatic diisocyanates. Examples of the aromatic dicarboxylic acid include isophthalic acid and terephthalic acid. Examples of the aromatic dianhydride include trimellitic anhydride. Examples of the aromatic diisocyanate include 4,4'-diphenylmethane diisocyanate, 2,4-tolylene diisocyanate, 2,6-tolylene diisocyanate, orthotolylene diisocyanate, and m-xylene diisocyanate.

The filler that may be contained in the heat-resistant porous layer may be the one selected from an organic powder, an inorganic powder, and a mixture thereof. The particles which constitute the filler preferably have an average particle diameter of 0.01 to 1 μm. Examples of the shape of the filler include substantially spherical, plate-like, columnar, acicular, whisker-like, and fibrous shapes, and particles of any shape may be used. Preferable are substantially spherical particles because they easily form uniform pores.

Examples of the material of organic powder as a filler include the organic materials such as: styrene, vinyl ketone, acrylonitrile, methyl methacrylate, ethyl methacrylate, glycidyl methacrylate, glycidyl acrylate, and methyl acrylate alone, or copolymers of two or more thereof; fluorine resins such as polytetrafluoroethylene, tetrafluoroethylene-hexafluoropropylene copolymer, tetrafluoroethylene-ethylene copolymer, and polyvinylidene fluoride; melamine resins; urea resins; polyolefins; and polymethacrylate. The organic powder may be used alone or in combination of two or more thereof. Among these organic powders, a polytetrafluoroethylene powder is preferable in view of chemical stability.

Examples of the material of inorganic powder as a filler include inorganic materials such as metal oxides, metal nitrides, metal carbides, metal hydroxides, carbonates, and sulfates. Examples include alumina, silica, titanium dioxide, and calcium carbonate. The inorganic powder may be used alone or in combination of two or more thereof. Among these inorganic powders, an alumina powder is preferable in view of chemical stability. More preferably, all the particles which constitute the filler are alumina particles; still more preferably, all the particles which constitute the filler are alumina particles, and part or all of them are substantially spherical alumina particles.

The filler content in the heat-resistant porous layer depends on the specific gravity of the material of the filler, and for example, in cases where all the particles which constitute the filler are alumina particles, when the total weight of the heat resistant porous layer is taken as 100, the weight of the filler is usually 20 to 95 parts by weight, preferably 30 to 90 parts by weight. These ranges may be appropriately set in accordance with the specific gravity of the material of the filler.

(Porous Film)

In the laminated porous film, the porous film contains a thermoplastic resin. The thickness of the porous film is usually 3 to 30 μm, more preferably 3 to 20 μm. The porous film, similarly to the above-described heat-resistant porous layer, has micropores and the size of the pore is generally not more than 3 μm, preferably not more than 11 μm. The porosity of the porous film is usually 30 to 80% by volume, preferably 40 to 70% by volume. In the sodium secondary battery, the porous film can close the micropores by the softening thermoplastic resin composing the micropores at a temperature above the normal operating temperature.

Examples of the thermoplastic resin contained in the porous film include those which soften at 80 to 180° C., and those which are insoluble in an electrolytic solution in the sodium secondary battery may be selected. Examples of the thermoplastic resin include polyolefins such as polyethylene and polypropylene, and thermoplastic polyurethanes, and a mixture of two or more thereof may be used. In order to cause shutdown by softening at lower temperatures, polyethylene is preferable as the thermoplastic resin. Examples of the polyethylene include polyethylenes such as low-density polyethylene, high-density polyethylene, and linear polyethylene, as well as ultra-high molecular weight polyethylene. In order to further increase the puncture strength of the porous film, the thermoplastic resin preferably contains at least ultra-high molecular weight polyethylene. In addition, from the viewpoint of production of the porous film, the thermoplastic resin may preferably contain a wax made of a polyolefin of low molecular weight (weight-average molecular weight of not more than 10,000).

<Electrolytic Solution or Solid Electrolyte>

The electrolytic solution contains an electrolyte and an organic solvent. The electrolyte is dissolved in the organic solvent. Examples of the electrolyte include $NaClO_4$, $NaPF_6$, $NaAsF_6$, $NaSbF_6$, $NaBF_4$, $NaCF_3SO_3$, $NaN(SO_2CF_3)_2$, lower aliphatic carboxylic sodium salts, and $NaAlCl_4$. Two or more kinds of electrolytes may be mixed. Among these, a fluorine-containing electrolyte which contains at least one selected from the group consisting of $NaPF_6$, $NaAsF_6$, $NaSbF_6$, $NaBF_4$, $NaCF_3SO_3$, and $NaN(SO_2CF_3)_2$ is preferred.

Following may be used as organic solvent; Carbonates such as propylene carbonate, ethylene carbonate, dimethyl carbonate, diethyl carbonate, ethyl methyl carbonate, isopropyl methyl carbonate, vinylene carbonate, vinylethylene carbonate, methyl vinylene carbonate, dimethyl vinylene carbonate, 4-trifluoromethyl-1,3-dioxolane-2-one, and 1,2-di(methoxycarbonyloxy)ethane; ethers such as 1,2-dimethoxyethane, 1,3-dimethoxypropane, pentafluoropropyl methylether, 2,2,3,3-tetrafluoropropyl difluoromethylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and those obtained by introducing an fluorine substituent into the above-described organic solvents. Examples of the organic solvent with an introduced fluorine substituent include 4-fluoro-1,3-dioxolane-2-one and difluoroethylene carbonate. Usually, two or more kinds of these are mixed and used as the organic solvent.

To make better the wettability with the separator, one kind or two or more kinds of surfactants of polyoxyethylene ethers having trioctylphosphate and perfluoroalkyl groups, perfluorooctane sulfonic acid esters and the like may be added to the electrolytic solution. The addition amount of the surfactant is preferably 3% by weight or less, more preferably 0.01 to 1% by weight to the total weight of the electrolytic solution.

A solid electrolyte may be used instead of the electrolytic solution. As the solid electrolyte, a polymer electrolyte such as polymers of polyethylene oxide, or a polymer including at least one of polyorganosiloxane chains or polyoxyalkylene chains may be used. A solid electrolyte of so-called gel type in which the electrolytic solution is held in polymer molecules may be used. The safety may be further improved by using a sulfide electrolyte such as $Na_2S$—$SiS_2$, $Na_2S$—$GeS_2$, $Na_2S$—$P_2S_5$, or $Na_2S$—$B_2S_3$, an inorganic compound electrolyte which contains a sulfide such as $Na_2S$—$SiS_2$—$Na_3PO_4$ or $Na_2S$—$SiS_2$—$Na_2SO_4$, or a NASICON-type electrolyte such as $NaZr_2(PO_4)_3$. As to the sodium secondary battery of the present invention, in the case of using a solid electrolyte, the solid electrolyte may sometimes act as a separator, and in such a case, no separator may be required.

<Use of Sodium Secondary Battery>

Because of high energy density, sodium secondary batteries are suitable for power sources for small-size devices such as portable telephones, portable audios, and laptop personal computers; power sources for transport machines such as automobiles, motorcycles, electric chairs, forklifts, trains, airplanes, ships, space crafts, and submarines; power sources for agricultural machines such as power tillers; power sources for outside leisure such as camping equipment; and power sources for transportable stationary devices such as vending machines.

Further, since the raw materials which are abundance in supply are used and inexpensive, sodium secondary batteries are suitable for power sources to be installed outdoors/indoors for work sites, buildings and the like; load-leveling power sources for various types of power generation of chargers for solar batteries, chargers for wind power generation and the like; stationary power sources for low-temperature environments such as the inside of refrigerated and freezing warehouses, and very cold districts; stationary power sources for high temperature environments such as deserts; and stationary power sources for space environments such as space stations.

EXAMPLES

The present invention is described below further in detail based on the examples thereof. Various evaluations on the sodium-containing transition metal compound were performed by the measurements below.

1. Powder X-Ray Diffraction Measurement of Sodium-Containing Transition Metal Compound The powder X-ray diffraction measurement of the sodium-containing transition metal compound was performed by RINT2500TTR type manufactured by Rigaku Corporation. In the measurement, the sodium-containing transition metal compound was charged into an exclusive holder, and then measured in a range of the diffraction angle 2θ of 10 to 90° with a Cu Kα ray source, whereby a powder X-ray diffraction pattern was obtained.

2. Composition Analysis of Sodium-Containing Transition Metal Compound

The powder of the sodium-containing transition metal compound was dissolved in hydrochloric acid, and then the composition analysis was performed by inductive coupling plasma emission spectrometry (SPS3000 manufactured by SII, hereinafter sometimes referred to as ICP-AES).

Production Example 1 (Production of Electrode Active Material $A^1$)

In a beaker made of polypropylene, 44.88 g of potassium hydroxide was added to 300 ml of distilled water, and dissolved by stirring until it was completely dissolved to prepare an aqueous potassium hydroxide solution (precipitating agent). In another beaker made of polypropylene, 21.21 g of iron(II) chloride tetrahydrate, 19.02 g of nickel(II) chloride hexahydrate, and 15.83 g of manganese(II) chloride tetrahydrate were added to 300 ml of distilled water and dissolved by stirring to give an aqueous iron-nickel-manganese-containing solution. The aqueous iron-nickel-manganese-containing solution was added dropwise to the precipitating agent while stirring the precipitating agent, and thus a slurry with a precipitate produced was obtained. Subsequently, the slurry was filtered, washed with distilled water, and dried at 100° C., whereby the precipitate was obtained. The precipitate and sodium carbonate were weighed in such a way that the molar ratio of Fe:Na became 0.4:1, and then dry mixing was performed in an agate mortar, whereby a mixture thereof was obtained. Subsequently, the mixture was put in a calcining container made of alumina, calcined by an electric furnace in the air atmosphere at 900° C. for 6 hours, and then cooled to room temperature, whereby the electrode active material $A^1$ was obtained. The powder X-ray diffraction analysis was performed on the electrode active material $A^1$, and consequently it was found that the electrode active material is attributed to α-$NaFeO_2$ type of crystal structure. Further, the electrode active material $A^1$ was analyzed in composition by ICP-AES and thus, the molar ratio of Na:Mn:Fe:Ni was found to be 1:0.4:0.3:0.3.

Example 1 (Production of Sodium Secondary Battery Electrode $E^1$)

Used were: the above-described $A^1$ as the electrode active material; acetylene black (HS100, manufactured by Denki Kagaku Kogyo Kabushiki Kaisha, with BET specific surface area of 39 $m^2/g$) as a conductive material; PVdF #9130 solution (manufactured by Kureha Corporation) as a binder solution; and NMP (lithium battery grade, manufactured by Kishida Chemical Co., Ltd.) as an organic solvent. DISPERMAT (manufactured by VMA-GETZMANN) was used to stir and mix a composition having a weight ratio of 90:5:5:100 for electrode active material $A^1$:conductive material:binder:NMP, whereby an electrode mixture paste was obtained. The rotating condition of rotary blades was 2,000 rpm for 5 minutes. The resultant electrode mixture paste was applied to a 20-μm-thick aluminum foil by use of a doctor blade, dried at 60° C. for 2 hours and cut into a 4 cm-wide electrode. Then, the electrode was roll-pressed by use of a roll press (SA-602, manufactured by Tester Sangyo Co., Ltd.) at a pressure of 125 kN/m, whereby the sodium secondary battery electrode $E^1$ was obtained.

Example 2 (Production of Sodium Secondary Battery Electrode $E^2$)

The sodium secondary battery electrode $E^2$ was obtained according to the similar operation to that in Example 1 except that VT470 solution (manufactured by Daikin Industries, Ltd.) which contains a copolymer having a vinylidene halide-derived structural unit was used as the binder solution.

Example 3 (Production of Sodium Secondary Battery Electrode $E^3$)

Used were: the above-described $A^1$ as an electrode active material; acetylene black (HS100, manufactured by Denki Kagaku Kogyo Kabushiki Kaisha, with a BET specific surface area of 39 $m^2/g$) as the conductive material; and a mixture of PVA (PolyVinyl Alcohol manufactured by Sigma-Aldrich Japan, saponification degree=87 to 89%, Mw=146,000-186,000) and a polyacrylic acid-alkyl acrylate copolymer (AQUPEC 501EM, manufactured by Sumitomo Seika Chemicals Co., Ltd.) at 4:1 (in weight ratio) as a binder. The binder was dissolved in NMP in such a way that the composition became binder:NMP=5:95 (in weight ratio) and then used. A composition having a weight ratio of 90:8:2:100 for electrode active material $A^1$:conductive material:binder:NMP was stirred and mixed by use of T.K. FILL MIX 30-25 type (manufactured by PRIMIX Corporation), whereby an electrode mixture paste was obtained. The rotating condition of rotary blades was 5,000 rpm for 3 minutes. The resultant electrode mixture paste was applied to a 20-μm-thick aluminum foil by use of a doctor blade, dried at 60° C. for 2 hours and cut into a 4 cm-wide electrode by a roll press, which was roll-pressed by use of the roll press (SA-602, manufactured by Tester Sangyo Co., Ltd.) at a pressure of 125 kN/m, whereby the sodium secondary battery electrode $E^3$ was obtained.

Example 4 (Production of Sodium Secondary Battery Electrode $E^4$)

Used were: the above-described $A^1$ as an electrode active material; acetylene black (HS100, manufactured by Denki Kagaku Kogyo Kabushiki Kaisha, with BET specific surface area of 39 $m^2/g$) as a conductive material; and VT471 (manufactured by Daikin Industries, Ltd.) which is a copolymer having a vinylidene halide-derived structural unit as a binder. The binder was dissolved in NMP in such a way that the composition became binder:NMP=5:95 (in weight ratio) and then used. A composition having a weight ratio of 90:5:5:100 for electrode active material $A^1$:conductive material:binder:NMP was stirred and mixed by use of T.K. FILL MIX 30-25 type (manufactured by PRIMIX Corporation), whereby an electrode mixture paste was obtained. The rotating condition of rotary blades was 5,000 rpm for 3 minutes. The resultant electrode mixture paste was applied to a 20-μm-thick aluminum foil by use of a doctor blade, dried at 60° C. for 2 hours and cut into a 2 cm-wide electrode by use of a roll press, which was roll-pressed by use of the roll press (SA-602, manufactured by Tester Sangyo Co., Ltd.) at a pressure of 250 kN/m, whereby the sodium secondary battery electrode $E^4$ was obtained.

Example 5 (Production of Sodium Secondary Battery Electrode $E^5$)

Used were: the above-described $A^1$ as an electrode active material; a mixture of acetylene black (HS100, manufactured by Denki Kagaku Kogyo Kabushiki Kaisha, with BET specific surface area of 39 $m^2/g$) and ketjen black (ECP, Lion Corporation, with BET specific surface area of 800 $m^2/g$) at 4:1 (in weight ratio) as a conductive material; and VT471 (manufactured by Daikin Industries, Ltd.) which is a copolymer having a vinylidene halide-derived structural unit as a binder. The binder was dissolved in NMP in such a way that the composition became binder:NMP=5:95 (in weight ratio) and then used. A composition having a weight ratio of 90:5:5:100 for electrode active material $A^1$:conductive material:binder:NMP was mixed and kneaded in an agate mortar, whereby an electrode mixture paste was obtained. The resultant electrode mixture paste was applied to a 40-μm-thick aluminum foil by use of a doctor blade, dried at 60° C. for 2 hours and cut into a 2 cm-wide electrode by use of a roll press, which was roll-pressed by use of the roll press (SA-602, manufactured by Tester Sangyo Co., Ltd.) at a pressure of 50 kN/m, whereby the sodium secondary battery electrode $E^5$ was obtained.

Comparative Example 1 Production of Sodium Secondary Battery Electrode $D^1$)

Used were: the above-described $A^1$ as an electrode active material; acetylene black (HS100, manufactured by Denki Kagaku Kogyo Kabushiki Kaisha, with BET specific surface area of 39 $m^2/g$) as a conductive material; PVdF #1320 solution (manufactured by Kureha Corporation) as a binder: and NMP (lithium battery grade, manufactured by Kishida Chemical Co., Ltd.) as an organic solvent. A composition having a weight ratio of 95:2.5:2.5:56 for electrode active material $A^1$:conductive material:binder:NMP was stirred and mixed by use of T.K. FILL MIX 30-25 type (manufactured by PRIMIX Corporation), whereby an electrode mixture paste was obtained. The rotating condition of a rotary wheel was 5,000 rpm for 1 minute. The resultant electrode mixture paste was applied to a 20 μl-thick aluminum foil by use of a doctor blade, dried at 60° C. for 2 hours and cut into a 4 cm-wide electrode by a roll press, which was roll-pressed by use of the roll press (SA-602, manufactured by Tester Sangyo Co., Ltd.) at a pressure of 2.5 kN/m, whereby the sodium secondary battery electrode $D^1$ was obtained.

Comparative Example 2 (Production of Sodium Secondary Battery Electrode $D^2$)

Used were: the above-described $A^1$ as an electrode active material; acetylene black (HS100, manufactured by Denki Kagaku Kogyo Kabushiki Kaisha, with BET specific surface area of 39 $m^2/g$; as a conductive material; PVdF #9305 solution (manufactured by Kureha Corporation) as a binder; and NMP (lithium battery grade, manufactured by Kishida Chemical Co., Ltd.) as an organic solvent. A composition having a weight ratio of 95:2:3:57 for electrode active material $A^1$ conductive material:binder:NMP was mixed and kneaded in an agate mortar, whereby an electrode mixture paste was obtained. The resultant electrode mixture paste was applied to a 40 μm-thick aluminum foil by use of a doctor blade, dried at 60° C. for 2 hours and cut into a 2 cm-wide electrode by a roll press, which was roll-pressed by use of the roll press (SA-602, manufactured by Tester Sangyo Co., Ltd.) at a pressure of 50 kN/m, whereby the sodium secondary battery electrode D² was obtained.

<Measurement of Conductivity>

A double-sided tape (manufactured by Nichiban Co., Ltd.) was stuck to the surface of the electrode mixture of each of the sodium secondary battery electrodes $E^1$ to $E^5$, and $D^1$ and $D^2$ and peeled therefrom, whereby the electrode mixture was peeled off the electrodes $E^1$ to $E^5$ and $D^1$ and $D^2$. After the peeling, the conductivity of the electrode mixture which remains sticking to the double-sided tape was measured by Loresta-GP (manufactured by Mitsubishi Chemical Analytech Co., Ltd.). As the probe, ESP (MCP-TRF1) probe was used.

<Manufacture of Sodium Secondary Battery>

A coin cell was used to evaluate batteries with the electrodes. A positive electrode (i.e. each electrode of the sodium secondary battery electrodes $E^1$ to $E^5$, and $D^1$ and $D^2$) was put in a dimple at a lower part of the coin cell (manufactured by Hohsen Corporation) with the aluminum foil faced downward. Then, 1 M $NaPF_6$/propylene carbonate as an electrolytic solution, a polypropylene porous film (having a thickness of 20 μm) as a separator, and metal sodium (manufactured by Aldrich) as a negative electrode were combined to make a battery. The assembling of the battery was performed in a glove box in an argon atmosphere.

<Condition for Sodium Secondary Battery Evaluation>

The charge and discharge evaluations of the sodium secondary batteries were performed under the following conditions.

Charge: CC-CV (Constant Current-Constant Voltage) charging was performed from a rest potential to 4.0 V at 0.1 C rate (the rate at which charging is completed in 10 hours).

Discharge: CC (Constant Current) discharging was performed at 0.1 C rate (the rate at which discharging is completed in 10 hours), and cutoff was made at a voltage of 2.5 V.

After having performed 1 cycle of the charging and discharging, 9 cycles of charging and discharging, each cycle consisting of CC (Constant Current) charging to 4.0 V at 0.1 C rate and CC (Constant Current) discharging to 2.5 V at 0.1 C rate, were performed.

The charge-discharge efficiency was calculated by dividing the discharge capacity in the first cycle by the charge capacity in the first cycle.

The charge-discharge cycle characteristic was calculated by dividing the discharge capacity in the tenth cycle by the discharge capacity in the first cycle.

<Result of Evaluation>

Table 1 shows the result of conductivity measurement, electrode mixture density, charge-discharge efficiency of each sodium secondary battery, and charge-discharge cycle characteristic in the case of using each of the sodium secondary battery electrodes $E^1$ to $E^5$, and $D^1$ and $D^2$.

TABLE 1

| | Electrode | Conductivity S/cm | Electrode mixture density g/cm³ | Charge-discharge efficiency % | Charge-discharge cycle characteristic % |
|---|---|---|---|---|---|
| Example 1 | $E^1$ | 1.165 × 10⁻¹ | 1.96 | 69.6 | 76.2 |
| Example 2 | $E^2$ | 6.974 × 10⁻² | 2.45 | 86.8 | 85.9 |
| Example 3 | $E^3$ | 3.391 × 10⁻² | 2.11 | 69.2 | 90.5 |
| Example 4 | $E^4$ | 4.872 × 10⁻² | 2.64 | 90.1 | 81.4 |
| Example 5 | $E^5$ | 1.702 × 10⁻² | 2.27 | 90.7 | 73.2 |
| Comparative Example 1 | $D^1$ | 9.341 × 10⁻⁴ | 1.55 | 58.9 | 67.6 |
| Comparative Example 2 | $D^2$ | 5.0 × 10⁻⁷ or less | 2.00 | 30.9 | 77.2 |

The electrode $D^1$ showed a relatively better charge-discharge cycle characteristic, whereas it achieved a discharge capacity as small as about 30 mAh/g (others provided 100 mAh/g or more). That is, an amount of electricity which can be taken from a battery with the electrode $D^1$ is smaller than those in other batteries.

It was found from Table 1 that use of the sodium secondary battery electrode of the present invention enables the increase in the charge-discharge efficiency of the battery and the suppression of deterioration of the charge-discharge cycle characteristic.

Production Example 2 (Production of Laminated Porous Film)

(1) Production of Coating Slurry for Heat-Resistant Porous Layer

After 272.7 g of calcium chloride was dissolved in 4200 g of NMP, 132.9 g of paraphenylendiamine was added thereto and completely dissolved. To the resultant solution, 243.3 g of terephthalic acid dichloride was slowly added for polymerization to obtain a para-aramid. The solution was further diluted with NMP to obtain a para-aramid solution having a concentration of 2.0% by weight. To 100 g of the para-aramid solution obtained, 2 g of a first alumina powder (ALUMINA C manufactured by Nippon Aerosil Co., Ltd., having an average particle diameter of 0.02 m) and 2 g of a second alumina powder (SUMICORUNDUM AA03 manufactured by Sumitomo Chemical Co., Ltd., having an average particle diameter of 0.3 μm), 4 g in total, were added as a filler and mixed. The resultant mixture was treated with a nanomizer three times, further filtered through a wire net of 1-000 mesh, and deformed under reduced pressure to produce a coating slurry for a heat-resistant porous layer. The weight of the alumina powder (filler) relative to the total weight of the para-aramid and alumina powder was 67% by weight.

(2) Production and Evaluation of Laminated Porous Film

As a porous film, a polyethylene porous film (with a film thickness of 12 μm, an air permeability of 140 sec/100 cc, an average pore diameter of 0.1 μm, and a porosity of 50%) was used. The polyethylene porous film was fixed on a 100-μm-thick PET film, and the coating slurry for a heat-resistant porous layer was applied to the porous film by use of a bar coater manufactured by Tester Sangyo Co., Ltd. The applied porous film, while being integrated with the PET film, was immersed in water, a poor solvent, and a para-aramid porous film (heat-resistant porous layer) was deposited, after which the solvent was dried and the PET film was peeled off to obtain a laminated porous film which has the heat resistant porous layer and the porous film laminated to each other. The laminated porous film had a thickness of 16 μm, and the para-aramid porous film (heat-resistant porous layer) had a thickness of 4 μm. The laminated porous film had an air permeability of 180 sec/100 cc and a porosity of 50%. The cross section of the heat-resistant porous layer in the laminated porous film was observed by a scanning electron microscope (SEM), and it was found that the laminated porous film had relatively small micropores of about 0.03 to 0.06 µm and relatively large micropores of about 0.1 to 1 µm. The evaluation of the laminated porous film was performed by the methods described in A to C below.

(A) Measurement of Thickness

The thickness of the laminated porous film and the thickness of the porous film were measured in accordance with JIS standards (K7130-1992). As the thickness of the heat-resistant porous layer, a value obtained by subtracting the thickness of the porous film from the thickness of the laminated porous film was used.

(B) Measurement of Air Permeability According to Gurley Method

The air permeability of the laminated porous film was measured according to JIS P8117 by a digitally timed Gurley densometer manufactured by Yasuda Seiki Seisakusho Ltd.

(C) Porosity

A sample of the laminated porous film was cut into a square with sides of 10 cm, and the weight W (g) and the thickness D (cm) were measured. The weight (Wi; i is an integer of 1 to n) of each layer in the sample was determined, and the volume of each layer was determined from Wi and the true specific gravity (g/cm³) of the material of the layer. The porosity (% by volume) was determined by the following equation:

Porosity (% by volume)=100×{1−(W1/true specific gravity 1+W2/true specific gravity 2+ . . . +Wn/true specific gravity n)/(10×10×D)}.

In the examples described above, a sodium secondary battery which can further prevent thermal film breakage can be obtained by using, as a separator, the laminated porous film obtained in Production Example 2.

INDUSTRIAL APPLICABILITY

Using the sodium secondary battery electrode of the present invention, the charge-discharge efficiency of a sodium secondary battery can be increased, and the deterioration of the charge-discharge cycle characteristic can be suppressed. Thus, the present invention is industrially very useful.

The invention claimed is:

1. A sodium secondary battery electrode comprising a positive electrode mixture containing a positive electrode active material, a conductive material and a binder, and a current collector, wherein the electrode active material comprises a sodium-containing transition metal compound, the electrode mixture has a conductivity of $5.0\times10^{-3}$ S/cm or more, and the electrode mixture has a density of 1.6 g/cm³ or more wherein the sodium-containing transition metal compound is a sodium-containing transition metal oxide represented by the following formula (A):

$$Na_xMO_2 \qquad (A)$$

wherein M is at least two elements selected from the group consisting of Fe, Ni, and Mn, and x is from 1.0 to 1.2, and wherein the binder comprises a copolymer having a structural unit derived from vinylidene halide.

2. The sodium secondary battery electrode according to claim 1, wherein the conductive material comprises a carbon material, and the carbon material has a BET specific surface area of 10 m²/g or more.

3. A sodium secondary battery comprising the electrode according to claim 1 as a positive electrode.

4. The sodium secondary battery according to claim 3, further comprising a separator.

5. The sodium secondary battery electrode according to claim 1, wherein M is Fe, Ni and Mn.

6. The sodium secondary battery electrode according to claim 2, wherein M is Fe, Ni and Mn.

* * * * *